United States Patent [19]

Rouse

[11] Patent Number: 4,756,146
[45] Date of Patent: Jul. 12, 1988

[54] STRING TRIMMER HEAD AND METHOD

[75] Inventor: Russell V. Rouse, Conyers, Ga.

[73] Assignee: Snapper Power Equipment Division of Fuqua Industries, Inc., McDonough, Ga.

[21] Appl. No.: 16,010

[22] Filed: Feb. 18, 1987

[51] Int. Cl.⁴ .............................................. A01D 34/84
[52] U.S. Cl. ...................................... 56/12.7; 56/295; 30/276; 30/347
[58] Field of Search ................ 56/12.7, 17.5, 320, 56/295; 30/276, 347

[56] References Cited

U.S. PATENT DOCUMENTS

| | | | |
|---|---|---|---|
| 3,900,071 | 8/1975 | Crawford | 56/256 |
| 4,062,115 | 12/1977 | Lee | 30/276 |
| 4,190,954 | 2/1980 | Walto | 56/12.7 |
| 4,513,563 | 5/1985 | Raser et al. | 56/12.7 |
| 4,550,498 | 11/1985 | Oliver | 56/12.7 |
| 4,641,431 | 2/1987 | Lewing | 56/12.7 |
| 4,642,976 | 2/1987 | Owens | 56/12.7 |
| 4,644,655 | 2/1987 | Bottamiller et al. | 56/12.7 |

Primary Examiner—John Weiss
Attorney, Agent, or Firm—William E. Mouzavires

[57] ABSTRACT

A fixed line string trimmer head includes a pair of overlying sheet steel circular plates welded together to form two or more pairs of partially circular passages between the plates opening at each end into a recess extending continuously at and between the periphery of the plates. The passages are formed by recesses formed in the plates in registry with each other while the peripheral recess is formed by outwardly flared portions of the plates. The lower plate is also formed with an integral bulbous or ball portion to guide the trimmer head on the ground during use. The upper plate is provided with a connector sleeve centered with respect to the axes of rotation of the head for attaching the head to a drive shaft. The sleeve has internal threads for this purpose and also to permit an adapter to be utilized to allow the head to be attached to various sized drive shafts.

A discrete length of plain cutting line is placed into both passages by simply inserting the ends of the line into the adjacent ends of the passages and sliding the opposite end portions through the passages until they emerge from the remote ends of the passages with an intermediate portion of the line engaged against a land located between the adjacent passage ends.

25 Claims, 1 Drawing Sheet

U.S. Patent    Jul. 12, 1988    4,756,146
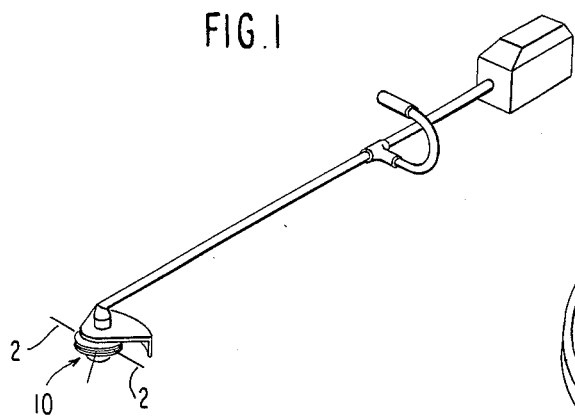
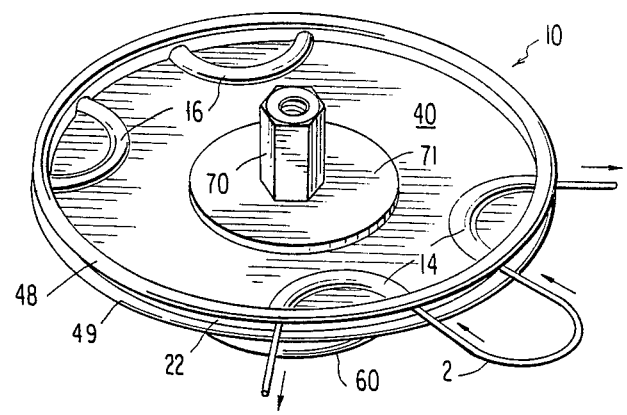
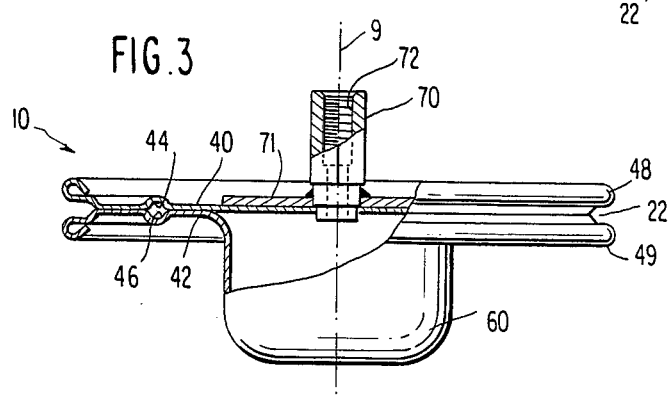
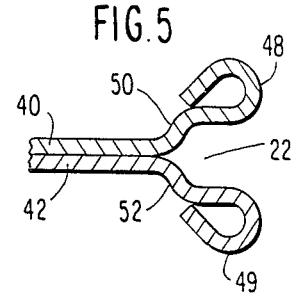
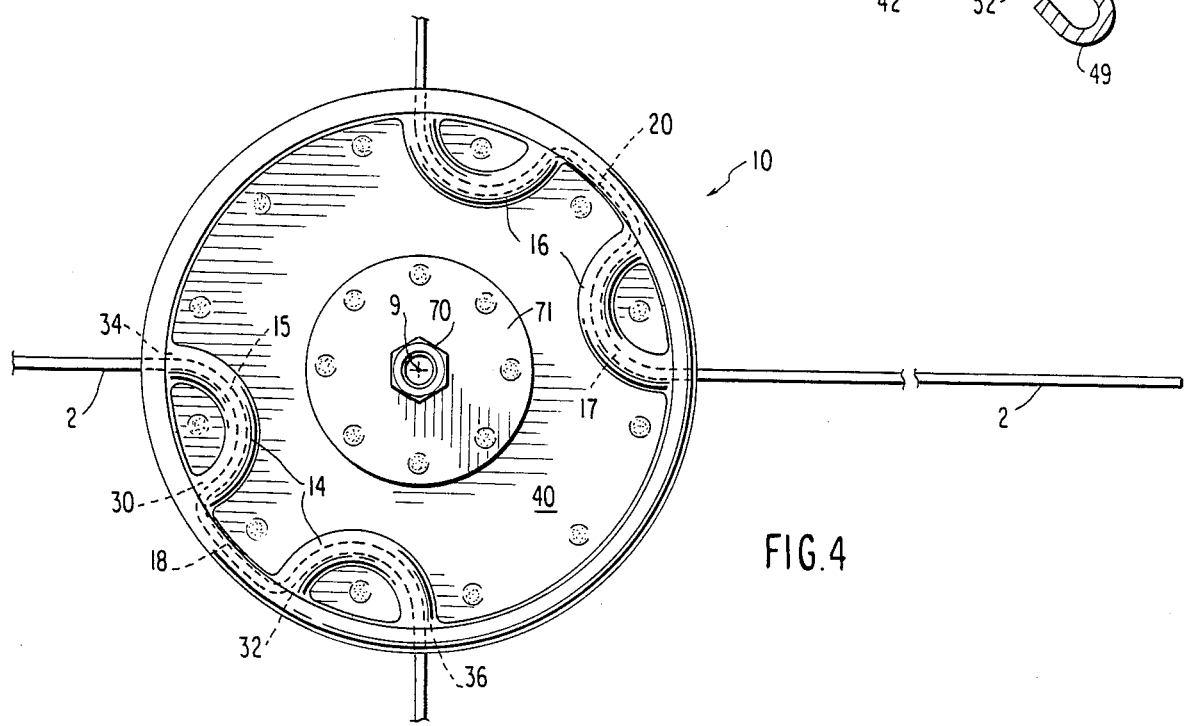

STRING TRIMMER HEAD AND METHOD

BACKGROUND OF INVENTION

In the field of outdoor power equipment, string timmers are often used to cut grass, weeds or other vegetation in areas where conventional rotary mowers or reel mowers are unable to gain access for proper cutting. The prior art is replete with various types of cutting heads for such trimmers which are equipped with plastic or metallic string-like elements rotatable with the head to cut the vegetation.

In one category of trimmer heads, the string-like cutter elements or lines are stored on one or more reels and fed off the reel to extend the line a predetermined length for cutting. When the cutting line is exhausted, a new line must be wound into proper position about the reel. Examples of such trimmer heads are disclosed in U.S. Pat. Nos. 3,708,967 Gerst et al, 3,826,068 Ballas et al, 3,859,776 Ballas et al, 4,137,694 Hopper, 4,068,377 Kimmel et al, and 4,148,141 Hoff. Other patents in this category which disclose various mechanisms for facili--tating incremental feeding of the cutting line off the storage reel are: U.S. Pat. Nos. 4,007,525 Utter, 4,131,997 Utter, 4,194,287 Palmieri et al, 4,185,381 Palmieri et al, 4,195,408 Palmieri et al, 4,242,797 Palmieri et al, and 4,276,691 Palmieri et al.

The prior art of the aforementioned category has developed to what is referred to as a "bump head" trimmer in which the cutting line is automatically fed out from a storage reel when pressure is applied to the head such as by "bumping" against the ground. A bump head trimmer is disclosed in U.S. Pat. No. 4,524,515 Oberg.

In another category of trimmer heads sometimes referred to as "fixed line" trimmer heads, one or more cutting lines of discrete length are fixed at one inner portion thereof to the trimmer head so that the free end of the line will be extended by centrifugal force into cutting position upon rotation of the cutter head. In some fixed line trimmer heads, a portion of the cutter head must be disassembled in order to install a new cutting line each time the previous line becomes worn or shortened through use. Examples of such types of fixed line trimmer heads are disclosed in U.S. Pat. Nos. 2,663,137 Asbury, 3,831,278 Voglesonger, 4,043,037 Okamoto et al, 4,062,115 Lee, 4,068,376 Briar, 4,089,114 Doolittle et al, 4,229,882 Chartier, 4,270,271 Feldman et al and 4,571,831 White.

The prior art also contains fixed line trimmer heads where the cutting line may be secured in place to the head without requiring disassembly of the head. Examples of these types appear in U.S. Pat. Nos. 2,707,859 Walker, 4,054,992 Ballas et al, 4,107,841 Jacyno et al, 4,107,841 Rebhun, 4,190,954 Walto, 4,268,964 Moore, 4,362,007 Kennedy et al, and 4,513,563 Roser et al. However, in many of these types of fixed line trimmer heads, the cutting line must be specifically shaped or carefully manipulated into position in order to secure it to the trimmer head. For example, note the specifically formed enlargements in some of the cutter lines disclosed in the aforementioned patents to Kennedy U.S. Pat. No. 4,362,007, Roser et al U.S. Pat. No. 4,513,563 and Ballas et al U.S. Pat. No. 4,054,992; and the specially equipped eyelets disclosed in the aforementioned patents to Jacyno U.S. Pat. No. 4,118,865 and Rebhun U.S. Pat. No. 4,107,841. While the cutter line disclosed in Walto U.S. Pat. No. 4,190,954 need not be specifically preformed or shaped, it must be crossed under an associated cutter line and carefully manipulated under tabs in the cutter head in order to secure it in place. In the FIG. 4 embodiment of Ballas U.S. Pat. No. 4,054,992, the cutting line must be pressed laterally and upwards into elongated passages formed in the cutter head. In Moore U.S. Pat. No. 4,268,964 the cutting line must be threaded through a loop and doubled back on itself.

The prior art discussed above represents many attempts to simplify the method and structure by which the cutter line is installed and secured to the trimmer head in order that a cutting operation may proceed without prolonged interruption and bother to install a new cutting line when the previous line becomes worn and shortened through use. The present invention is directed to this and other goals as will appear below.

For the sake of completeness, the following patents are also cited because it is through that they may be considered pertinent to the present invention even though they disclose wire brush heads rather than string trimmer heads and are considered by applicant to be less pertinent than the art cited above: U.S. Pat. Nos. 181,416 Davis, 1,526,579 Albertson and 2,102,178 Gerhardt.

OBJECTS OF THE PRESENT INVENTION

The present invention relates to a novel and improved "fixed line" trimmer head for string trimmers as well as a method for installing and securing a cutting line to the head.

One of the objects of the present invention is to provide a fixed line trimmer head which is improved to allow discrete lengths of cutting line to be quickly and easily attached to the trimmer head without requiring disassembly of any parts or any specifically shaped portions to be formed in the line to enable securement to the trimmer head. Included herein is such a trimmer head which securely holds the cutting line in place and yet allows the line to be easily and quickly replaced when it becomes worn in use.

Another object of the present invention is to provide such a fixed line trimmer head that will accommodate various gauges of cutting line including heavy duty gauges.

A further object of the present invention is to provide a fixed line trimmer head possessed of a simple but sturdy construction that may be economically manufactured for use on various types of string trimmers including conventional string trimmers now in use.

A still further object of the present invention is to provide a novel method of installing and securing a discrete length of plain cutting line to a trimmer head without requiring special tools or knotting or tying of the line and without relying on specially formed projections or formations in the line.

SUMMARY OF INVENTION

In summary, the trimmer head of the present invention includes at least one pair of arcuate or equivalently shaped passages each having opposite ends opening into the periphery of the head so that a pair of relatively adjacent and a pair of relatively remote passage-ends are provided on opposite sides of a land on the periphery of the head. A discrete length of cutting line is threaded into the passages by inserting the opposite ends of the line into the adjacent passage ends and sliding the opposite end portions of the line through the passages until the ends of the line emerge from the remote ends of the passage with an intermediate portion of the line engaged against the land. It is preferred that the side walls of the passages by imperforate to prevent access to the passages except through the opposite ends thereof thereby minimizing entry of foreign matter which could clog the passages.

Another aspect of the present invention is directed to a preferred embodiment of the trimmer head which includes upper and lower plates fixed to each other so that recesses extending arcuately in the plates are registered with each other to form at least two pairs of passages which are described above. The peripheral portions of the plates are flared outwardly to form a peripheral recess between the plates, and the aforementioned land is located in the peripheral recess.

The upper plate is provided with a connector element located at the center of the plate to enable attachment to a rotatable drive element of an associated trimmer. The connector element may receive adaptors to allow the head to be used on different sized drive elements of various trimmers.

The lower plate is provided with a bulbous element, preferably integrally formed on the plate, to guide the head on the ground during use.

DRAWINGS

Other objects and advantages of the present invention will become apparent from the following detailed description taken in conjunction with the attached drawings in which:

FIG. 1 is a perspective view of a string trimmer incorporating a fixed line head embodying the present invention;

FIG. 2 is an enlarged perspective view of the head with arrows designating the direction the cutting line is fed and moves during installation in the head;

FIG. 3 is an elevational view of the head with the cutting line removed and with portions shown in cross section;

FIG. 4 is a plan view of the head; and

FIG. 5 is an enlarged, fragmental view in cross section of a peripheral portion of the head.

DETAILED DESCRIPTION

Referring now to the drawings in detail, there is shown for illustrative purposes only, a fixed line trimmer head embodying the present invention in its preferred form. The head, generally designated 10, has a generally disc-like configuration including first and second pairs of passages 14 and 16 extending along arcuate paths in a plane generally parallel to the plane of the body 10. Each pair of passages 14 and 16 are adapted to hold a single cutting line 2 of a predetermined or discrete length, the cutting line being formed of any suitable material preferably plastic but not necessarily limited to plastic. The cross dimension of the passages 14 and 16 are accordingly sized, for example, 0.170 inches to receive various gauges of cutting line including heavy duty line.

As shown in FIG. 4, the pairs of passages 14 and 16 are symmetrically arranged on opposite sides of the center 9 of the body which also coincides with the axis of rotation of the body. The opposite ends of each passage 14 and 16 open into the periphery of the body and between each passage of each pair is a land 18 and 20 respectively. Moreover, a continuous circular circumferential recess 22 is formed in the periphery of the body 10 with the lands 18 and 20 being located in the base of the recess between each pair of passages as described.

The arcuate shape of each of the passages 14 and 16 is made so that the cutting line 2 may be inserted from one end and pushed through the passage to emerge from the other end of the passage with the walls of the passages 14, 16 guiding the line. For this reason, the bite or transitional portions 15 and 17 of the passages are curved or change direction gradually so that the cutting line may be pushed through the passage around the bite portions and through to the opposite end without interference from the walls of the passages. In the preferred embodiment, the passages 14 and 16 are formed as arcs of a circle with the radius along the center of the passage being, for example, 0.63 inches. Moreover, in the preferred embodiment where the outside diameter of the body is about 5.5 inches, the first and second pairs of passages 14 and 16 are spaced from each approximately ninety degrees. Although passages 14 and 16 are arcuate in the preferred embodiment, other equivalent shapes may be employed as long as the path changes direction sufficiently gradually to enable the cutting line to be threaded through the passages as will be described. Also, it is preferred that the passages 14 and 16 be closed to the atmosphere except for the opposite ends of the passages. In this way, access to the passages by the earth, vegetation or other foreign matter is minimized to avoid clogging of the passages making installation and removal of the line difficult.

In order to install the cutting line in accordance with a preferred method, the opposite ends of the line are inserted through the passage-ends (for example, 30 and 32 of passages 14) which are adjacent to each other and then both end portions of the line are merely pushed through the passages with the curvature of the walls of the passages guiding the line until the opposite ends of the line emerge from the passage ends 34 and 36 located remote from each other. The arrows in FIG. 2 illustrate the aforementioned directions of feeding and movement of the cuitting line. The opposite ends of the line are then pulled until the intermediate portion of the line is engaged against the land 18. In this position, the line projects from the head in equal lengths and extends in a serpentine or double S configuration so that it will be securely held against dislodgement from the head 10. When the line becomes worn after use, it may be quickly removed by simply pulling it out of the passages in the head after an intermediate section of the line is pulled away from the land 18.

In the preferred embodiment, the head body 10 is made of two overlying disc-like plates 40, 42 of suitable sheet material, preferably steel fixed together by any suitable means, preferably welding. The string passages 14 and 16 are formed by arcuate recesses 44 and 46 formed in the plates with a generally semicircular cross section as shown in FIG. 3. Recesses 44, 46 are located in the plates 40, 42 such that when the plates are fixed to each other, recesses 44, 46 will register with each other to form the passages as shown in FIGS. 2 and 3.

The periperhal portions of the plates 40, 42 are flared outwardly and rolled back on themselves at 48, 49 as shown in FIG. 5 to form the continuous circumferential recess 22 which is dimensioned to completely house the cutting line 2 on the upper and lower sides thereof. The rolled portions 48 and 49 present smooth surfaces thereby avoiding sharp edges that could otherwise cut into the cutting line 2. The rolled portions 48, 49 also serve to reinforce the periphery of the plates 40, 42. Additional reinforcement is provided by circumferential ribs 50, 52 formed in the peripheral portions of the plates 40 and 42 by offsetting the latter outwardly from the main body portions of the plates.

In order to help guide the head in use, the lower plate 42 is formed with a bulbous portion or ball 60 projecting from the lower side thereof. Guide portion 60 is an integral projection of lower plate 42 formed by drawing during manufacture. Guide portion 60 is centered with respect to the central axis 9 of the head.

In use, the trimmer head 10 is of course rotatable, and to connect the head to a rotatable drive element of an associated string trimmer, a connection 70 is secured to the top of the body at the center thereof. In the preferred embodiment, a connector sleeve 70 is secured in a central aperture formed in the top plate 40. Preferably, the connector is welded to a circular reinforcing plate 71 which in turn is welded to the top surface of top plate 40 with the lower end of the connector received in the aperture in the top plate 40. Connector 70 is provided with an hexagonal outer surface in transverse cross section, and internally is provided with threads 72 for engagement with threads on the drive element (not shown) of the associated trimmer apparatus (not shown). In addition, one or more adaptors are supplied with external threads to be received in the internal threads of the connector 70 to enable the head to be attached to different sized drive elements; the adaptor having internal threads for connection to the drive element.

It will therefore be seen that the present invention provides an improved fixed-line head for string trimmers which head may be easily supplied with cutting line without disassembling the head, or requiring special tools or cutting line or tying the line to the head with knots, etc. At the same time, the cutting line will be securely held in place during operation and may be quickly removed and replaced when it becomes worn through use. Additionally, the cutting line passages 14, 16 are completely closed on their opposite sides thereby preventing soil, etc. from clogging the passages. The trimmer head of the present invention is also economial to manufacture and has a sturdy construction that will withstand the rigors of use.

What is claimed is:

1. A trimmer head for cutting vegetation comprising a body having first means for attaching the body to a drive to be rotated about an axis of rotation, said body having a peripheral portion including a land and means forming at least one pair of reentrant passages on opposite sides of the land with each passage having opposite ends opening into the peripheral portion on opposite sides of the land for receiving a single cutting line through both passages with an intermediate portion of the line received about the land and with opposite ends of the line projecting outwardly beyond the respective ends of the passages located remote from each other, said passages being configured and dimensioned such that opposite ends of a cutting line may be inserted in one of the ends of said passages respectively and fed into the passages until said ends of the cutting line emerge from the other ends of said passages and an intermediate portion of the cutting line lies adjacent said land.

2. The trimmer head defined in claim 1 wherein said passages extend generally arcuately.

3. The trimmer head defined in claim 1 including a connector sleeve fixed to one side of the body at an axis of rotation thereof for connecting the body to a drive means of an associated string trimmer.

4. The trimmer head defined in claim 1 wherein said body has a recess extending along a peripheral portion thereof with the land located in said last-defined recess.

5. The trimmer head defined in claim 1 wherein said means defining said passges prevents access to said passages with the exception of access through the opposite ends of said passages.

6. The trimmer head defined in claim 1 wherein said body includes upper and lower plates fixed to each other, said plates having registering recesses formed in side thereof to define said passges.

7. The trimmer head defined in claim 6 wherein each plate has outwardly flared peripheral portions defining a peripheral recess extending along and between the periphery of said plates with the land located in said peripheral recess.

8. The trimmer head defined in claim 7 wherein said lower plate has a bulbous portion projecting centrally therefrom to guide the head in use.

9. The trimmer head defined in claim 1 wherein said body has a lower side including a guide projecting centrally therefrom to be engageable with a ground surface during use.

10. A head for a string trimmer comprising a disc-like body having a continuous circumferential recess in the periphery thereof, first and second pairs of passages located on opposite sides of the body respectively for holding two discrete lengths of cutting line respectively, said passages extending generally arcuately in a plane generally parallel to the plane of the body with each passage opening at opposite ends into the circumferential recess, a pair of lands respectively associated with each pair of passages and located in the circumferential recess between the associated pair of passages, the passages extending along paths configured to allow cutting line to be inserted into one end of each passage and to be slid through the passage to emerge from the other end of the passage with the passages guiding the movement of the cutting line during installation.

11. The head defined in claim 10 wherein said body includes upper and lower plates fixed together and having peripheral portions flared outwardly to define the circumferential recess, said plates have recesses in registry with each other defining said passges.

12. The head defined in claim 11 wherein said lower plate has an integral bulbous portion projecting from a central portion thereof for guiding the head in use.

13. The head defined in claim 12 further including a connector fixed to the upper plate at a central portion thereof for connecting the head to a drive element.

14. The head defined in claim 13 further including a reinforcing plate fixed to the upper plate about the central portion thereof and wherein said connector is fixed to the reinforcing plate, and wherein said upper and lower and said reinforcing plates are made from steel with the upper and lower plates being welded to each other and the reinforcing plate welded to the upper plate.

15. The head defined in claim 10 wherein said body has means closing the passages except for the opposite ends thereof to minimize entry of foreign matter into the passages.

16. The head defined in claim 13 wherein said connector includes internal threads and there is further included an adaptor having external threads receivable in the connector threads for adapting the head to a particular string trimmer drive element.

17. A method of installing and securing a discrete length of cutting line made of self-supporting material into a head for a string trimmer comprising the steps of inserting opposite ends of the line into two spaced apart generally arcuate passages formed in the head on opposite sides of a land located on the periphery of the head, and pushing the opposite end portions of the line through the passages until the line emerges from ends of the passages at the periphery of the head and an intermediate portion of the line is engaged against the land.

18. A trimmer head for cutting vegetation comprising a body having first means for attaching the body to a drive to be rotated about an axis of rotation, said body having a peripheral portion including a land and means forming at least one pair of generally arcuate passages on opposite sides of the land with each passage having opposite ends opening into the peripheral portion on opposite sides of the land for receiving a single cutting line through both passages with an intermediate portion of the line received about the land and with opposite ends of the line projecting outwardly beyond the respective ends of the passages located remote from each other, and wherein said body includes upper and lower plates fixed to each other, said plates having registering arcuate recesses formed in sides thereof to define said arcuate passages.

19. The trimmer head defined in claim 18 wherein each plate has outwardly flared peripheral portions defining a recess extending along and between the periphery of the plates with the land located in said peripheral recess.

20. The trimmer head defined in claim 18 wherein the lower plate has a bulbous portion projecting centrally therefrom to guide the head in use.

21. The trimmer head defined in claim 20 wherein said bulbous portion is formed integral with the lower plate.

22. The trimmer head defined in claim 19 wherein the lower plate has an integral bulbous portion projecting centrally therefrom to guide the head in use.

23. The trimmer head defined in claim 21 including a connector sleeve fixed to the upper plate for attaching the trimmer head to a rotatable drive element.

24. A trimmer head for cutting vegetation comprising a body having first means for attaching the body to a drive to be rotated about an axis of rotation, said body having a peripheral portion including a land and means forming at least one pair of generally arcuate passages on opposite sides of the land with each passage having opposite ends opening into the peripheral portion on opposite sides of the land for receiving a single cutting line through both passages with an intermediate portion of the line received about the land and with opposite ends of the line projecting outwardly beyond the respective ends of the passages located remote from each other, and a second pair of arcuate passages similar to said first pair but located on a side of the body opposite the first pair and in symmetrical relation with the first pair of passges.

25. A method installing and securing a discrete length of cutting line made of self-supporting material into a head of a string trimmer comprising the steps of inserting opposite ends of the line into two spaced apart reentrant passages formed in the head with the opposite ends of the passages opening into the periphery of the head on opposite sides of a land located on the periphery of the head, and pushing the opposite end portions of the line through the passages until the line emerges from ends of the passages at the periphery of the head and an intermediate portion of the line is engaged against the land.

* * * * *

UNITED STATES PATENT AND TRADEMARK OFFICE
CERTIFICATE OF CORRECTION

PATENT NO. : 4,756,146

DATED : July 12, 1988

INVENTOR(S) : Russell V. Rouse

It is certified that error appears in the above-identified patent and that said Letters Patent is hereby corrected as shown below:

Column 2, line 19, after "is" change "through" to --thought--.

Column 3, line 5, after "passages" change "by" to --be--.

Column 6, line 15, before "thereof" change "side" to --sides--.

Signed and Sealed this

Eighteenth Day of July, 1989

Attest:

DONALD J. QUIGG

*Attesting Officer*  *Commissioner of Patents and Trademarks*